June 21, 1955 W. F. SHANK 2,711,228
BRAKE ACTUATING DEVICE FOR TOWED VEHICLE
Filed March 30, 1951 2 Sheets-Sheet 2
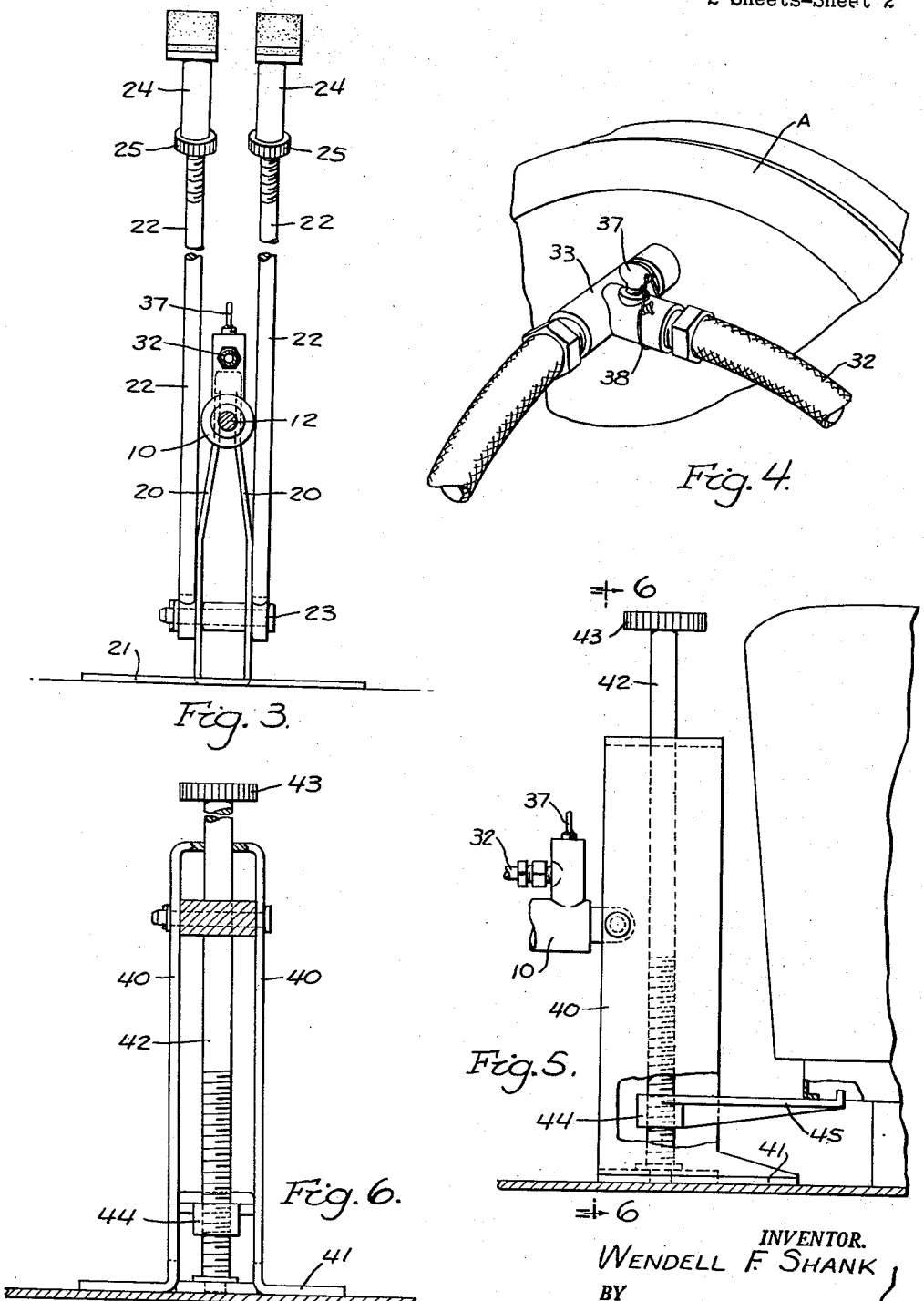
INVENTOR.
WENDELL F. SHANK
BY
Gregory S. Dolgorukov
ATTORNEY.

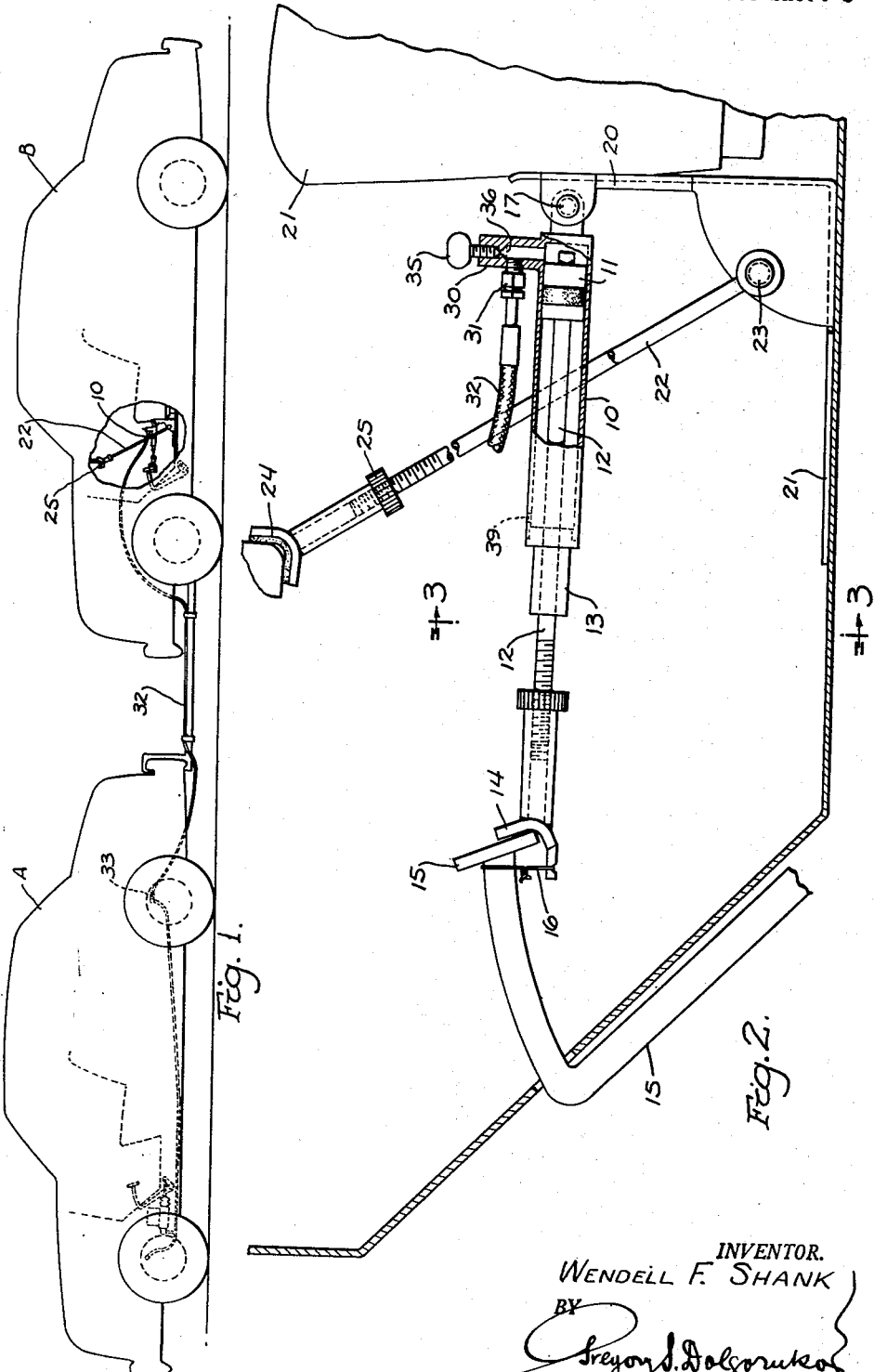

United States Patent Office 2,711,228
Patented June 21, 1955

2,711,228

BRAKE ACTUATING DEVICE FOR TOWED VEHICLE

Wendell Floyd Shank, Detroit, Mich.

Application March 30, 1951, Serial No. 218,377

3 Claims. (Cl. 188—3)

This invention relates to brakes and more particularly to an improved device for operating the brake system of a towed motor vehicle or a trailer from the towing vehicle and in synchronized relation with the brake system thereof.

The need for a simple, dependable and inexpensive device of such a character has been keenly felt in the art for a number of years, and many constructions have been proposed by those skilled in the art. Electric, hydraulic, and pneumatic devices, devices operated by the manifold vacuum and of other constructions have been offered. However, for various reasons none of these devices received a universal or even a sufficiently wide application. High cost, complicated construction, necessity to employ different or tricky leg movements in operating the brakes of the towing vehicle are examples of such reasons.

One of the objects of the present invention is to provide an improved device whereby the brake system of a towed motor vehicle can be operated by operating in a regular manner and without any additional or tricky movements the brake system of the towing vehicle.

Another object of the present invention is to provide an improved device for operating from the towing vehicle the brake systems of both the towing and the towed vehicles, in which device all pedal attachments or complicated controls for the pedal of the towing vehicle are entirely eliminated, thereby eliminating the source of possible confusion for the operator as well as the necessity of changing his driving habits.

A further object of the invention is to provide an improved device selectively attachable to towed motor vehicle, such as a passenger automobile or a truck, which device automatically reproduces in the towed vehicle the braking movements of the brake pedal effected manually in towing vehicle by the operator thereof.

A still further object of the present invention is to provide an improved device of the character specified in the preceding paragraph, which device is very light and compact, may be carried around by a delivery driver in a small suitcase or a box, and installed in any motor vehicle and removed therefrom in a simple and easy manner.

A still further object of the present invention is to provide an improved hydraulic device for operating from a vehicle having hydraulic brakes the brake system of another vehicle having hydraulic brake system or a brake system of a different nature, such as pneumatic or electric.

It is an added object of the present invention to provide an improved device of the foregoing nature, which is simple and rugged in construction, safe and dependable in operation, and is inexpensive to manufacture.

Further objects and advantages of the invention will be apparent from the following description, taken in connection with the appended drawings, in which:

Fig. 1 is a side view, partly in section, showing my improved brake device operatively installed to operate the brake system of a towed passenger motor vehicle.

Fig. 2 is a view showing on an enlarged scale and partly in section the pedal-operating cylinder of the device of Fig. 1 and mounting means therefor.

Fig. 3 is a front view of the construction of Fig. 2, the observer being presumed to look thereon in the direction of the arrows from the plane 3—3 of Fig. 2.

Fig. 4 is a perspective view showing the method and means for connecting the device to the hydraulic brake system of a towing or front vehicle.

Fig. 5 is a modified attachment or mounting means for the device.

Fig. 6 is a front view of the construction of Fig. 5, the observer looking in the direction of the arrows from the plane 6—6 of Fig. 5.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention I provide a hydraulic power cylinder operatively mountable in a detachable manner in the towed vehicle to depress the brake pedal thereof when hydraulic pressure within the cylinder increases. Hydraulic pressure is supplied to the cylinder by connecting the same with the aid of a flexible conduit directly with the hydraulic system of the towing vehicle. By virtue of such a construction the brake pedal of the towed vehicle is made to reproduce the movements of the brake pedal in the towing vehicle when the same is operated by the driver in a usual manner. The device is provided with improved mounting means insuring secure and tight mounting of the device in a passenger car or a truck of any make and to prevent binding or jamming of its operative parts. Means are also provided to eliminate possible air pockets in the system, and to insure simple and easy connection of the device to the hydraulic system of the towing vehicle. The device may be used on towed vehicles having brakes of types other than hydraulic. More than two cars may be connected together with the use of my improved devices.

In the drawings, there is shown by way of example, an improved device embodying the present invention. Referring to Figs. 1–4, the device illustrated therein comprises a power cylinder designated by the numeral 10 and having a piston 11 slidably fitted therein. A piston rod 12 passes through the guiding extension 13 of the cylinder and has a threaded end carrying a pedal-contacting bracket 14 adapted to bear against the brake pedal 15 of the towed vehicle B, and connected thereto with the aid of a wire loop 16, or in any other suitable manner. The threaded connection of the bracket 14 and the piston rod 12 enables the operator to adjust the length of the rod, when installing the device, to provide or compensate for difference in vehicle constructions.

The rear end of the cylinder 10 is hingedly connected as shown at 17 to the vertical portion 20 of a mounting bracket bearing against the front seat of the vehicle. The horizontal plate portion 21 of the mounting bracket is adapted to rest flat on the floor of the vehicle. Tightening rods 22 have their lower ends hingedly connected as at 23 to the mounting bracket and their upper ends threaded and carrying padded brackets 24 adapted to bear against the lower edge of the dashboard or instrument panel.

The brackets 24 slide freely on the threaded ends of the rods 22 and are pressed upwardly with the aid of adjustment nuts 25. By virtue of such a construction and hinged connection of the rods 22 to the mounting bracket, the brackets 24 may be brought in contact with the dashboard or other part of the cowl construction of motor vehicles of various types and makes.

An extension 30 provided on the rear end of the power cylinder 10 is adapted to receive a suitable connection 31 provided on the rear end of a flexible hose 32, which hose has sufficient length to reach the towing vehicle A and be connected to the hydraulic brake system thereof with the aid of a T connection 33 carried by the front end of said hose 32. The connection 33 is adapted to be interposed into a separated line connection of the towing vehicle.

Means are provided to release any air which may accumulate in the device and tend to interfere with the proper operation thereof. Said means are exemplified by a screw 35 provided in the extension 30 and having a sealing end adapted when tightened, to close the air vent 36. A similar screw 37 is provided on the T connection 33, which screw has the additional function of closing the end of the hose when the device is disconnected. When the screw 37 is opened, it may be locked in place with the aid of a wire loop 38, or other similar means, to prevent its self-closing or falling out.

It will now be seen in view of the foregoing that depressing the brake pedal in vehicle A causes raising of hydraulic pressure in the brake system thereof and desired application of brakes. At the same time it causes increase of hydraulic pressure within the power cylinder 10 and movement of the piston 11, in consequence whereof the bracket 14 depresses the brake pedal 15 of the vehicle B. The air from the front end of the cylinder 10 escapes through the vent 39. Releasing the brake pedal in the vehicle A causes the brake pedal springs in both vehicles to return the brake pedals to their original positions.

It should be understood that since the force required to depress the pedal 15 need not be very large but must act through a certain distance, the diameter of the cylinder 10 is so selected as to be as small as possible and yet to give the required force on the piston. Such a construction is desired in order to keep operation of the cylinder 10 within the capacity of the hydraulic brake master cylinder of the vehicle A. While a piston with a piston rod are shown in the drawings, it will be understood that a plunger may also be used with success. In one actual model of my device a ½" plunger gave entirely satisfactory performance.

Figs. 5 and 6 show modified mounting means for my improved device. Said means comprise a standard 40 having a flat base 41, in which standard there is provided a vertically extending screw or bolt 42 having an operating head 43 and a lower end journalled in the base 41. A nut 44 slidable in the standard 40 but restrained from rotation therein is carried by the bolt 42. Rotating the head 43 causes the nut 44 to go up or down in the standard. A hook finger 45 is provided on the nut 44 and is adapted to reach under the front seat and engage the rigid front member of the seat construction. Thus the standard may be tightly fixed in place for proper support of the power cylinder 10.

There is thus provided an improved brake device whereby the objects of the present invention and numerous added advantages are attained.

I claim:

1. Mounting means for the power cylinder of a device operatively connecting brake system of a towing vehicle to that of a towed vehicle, said means including a bracket placeable on the floor of the towed vehicle and against the front seat thereof, and at least one adjustably extensible rod having its lower end hingedly mounted on said bracket and its upper end adapted to abut against the cowl construction of the vehicle.

2. Mounting means for the power cylinder of a device operatively connecting brake system of a towing vehicle to that of a towed vehicle, said means including an angular bracket having a horizontal portion placeable on the floor of the vehicle and a vertical portion placeable against the front seat of the towed vehicle and hingedly connected to the rear end of said power cylinder, and at least one tightening rod having its lower end hingedly mounted on said bracket and its upper end adapted to abut against the dashboard of the vehicle.

3. In a brake device having a power cylinder detachably mountable in a towed vehicle for operating the brake pedal thereof, mounting means for said power cylinder, said means comprising an angular bracket having a horizontal portion placeable on the floor of the towed vehicle, a vertical portion placeable against the front seat of the towed vehicle, hinge means connecting said vertical portion to the rear end of the power cylinder, two adjustably extensible rods arranged on both sides of the power cylinder and having their lower ends hingedly connected to said bracket, and upper ends adapted to abut against the lower edge of the dashboard.

References Cited in the file of this patent

UNITED STATES PATENTS

| | | |
|---|---|---|
| 2,177,469 | White | Oct. 24, 1939 |
| 2,207,228 | Seppmann | July 9, 1940 |
| 2,325,846 | Forbes | Aug. 3, 1943 |
| 2,362,324 | Stromberg | Nov. 7, 1944 |